UNITED STATES PATENT OFFICE.

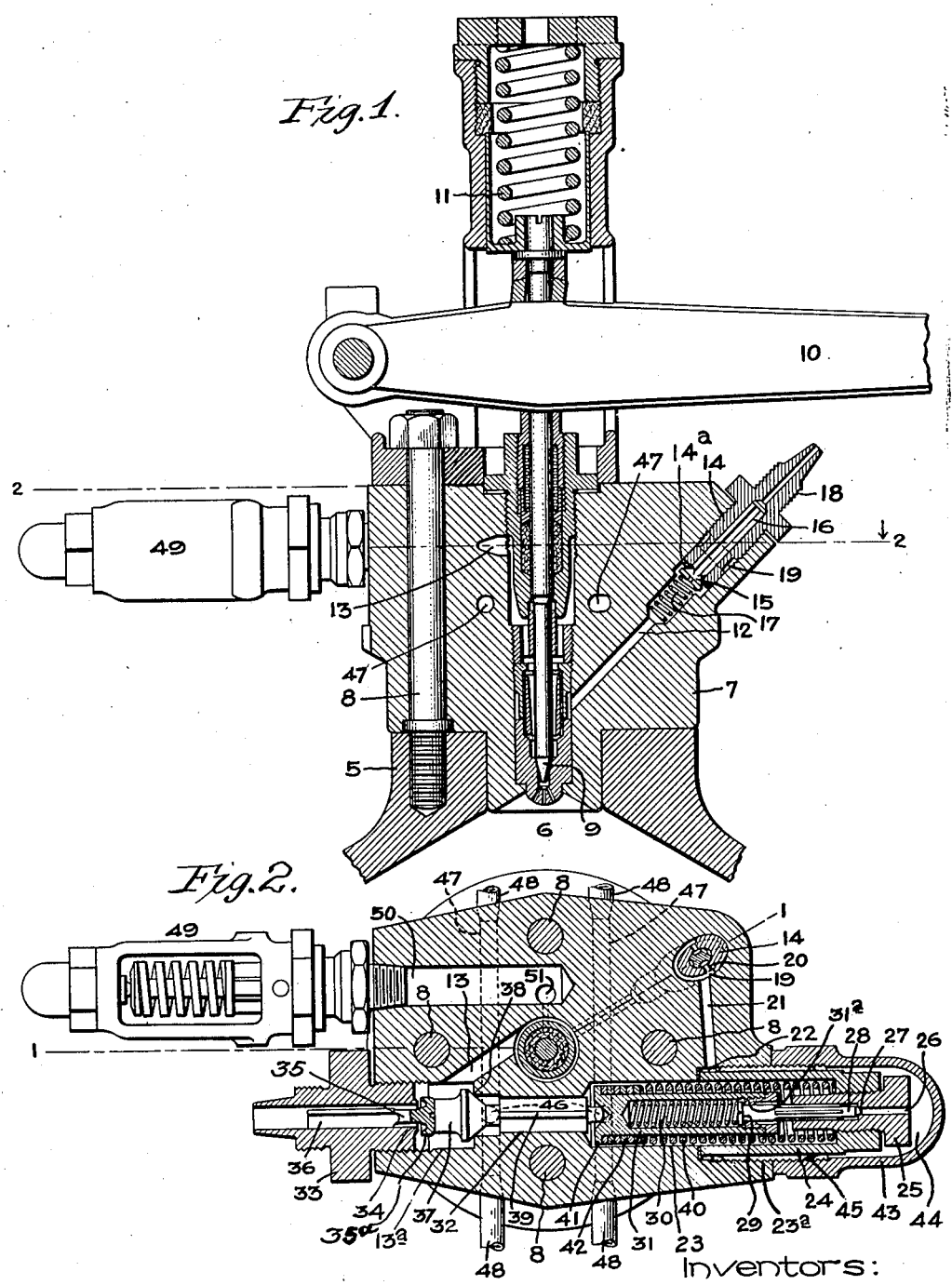

WILLIAM EVERETT VER PLANCK AND HENRY W. STOCK, OF ERIE, PENNSYLVANIA, ASSIGNORS TO GENERAL ELECTRIC COMPANY, A CORPORATION OF NEW YORK.

INTERNAL-COMBUSTION ENGINE.

1,298,605.   Specification of Letters Patent.   Patented Mar. 25, 1919.

Application filed October 24, 1917. Serial No. 198,288.

*To all whom it may concern:*

Be it known that we, WILLIAM EVERETT VER PLANCK and HENRY W. STOCK, citizens of the United States, residing at Erie, county of Erie, State of Pennsylvania, have invented new and useful Improvements in Internal-Combustion Engines, of which the following is a specification.

The present invention relates to internal combustion engines of the high compression type in which fuel is supplied by a suitable pump to a fuel injector from which it is blown into the engine cylinder by a blast of air. The admission of the fuel and blast air is controlled by the needle valve of the fuel injector which needle valve is opened and closed at regular intervals by suitable mechanism driven by the engine, The fuel pump is operated from the engine shaft as is also a compressor which supplies the blast air. Such engines must be started by some auxiliary source of power and turned over until the compression in the cylinder or cylinders brings the air in the combustion chamber to a sufficiently high temperature to ignite the fuel, and also, since the blast air compressor is operated from the crank shaft, until the blast pressure is built up sufficiently high to blow the fuel into the combustion space of the cylinder against the pressure therein. Such engines may be started for example by operating the scavenging air compressor which is used in connection with such engines as an air engine, or by means of a motor, or otherwise. Since the fuel pump is driven by the engine, and since the fuel valve is opened at regular intervals by the engine, it follows that unless means are provided to prevent it, as the engine turns over, fuel will be forced by the successive pump strokes into the fuel injector and either collect therein or work into the cylinder where it will cause dangerously high pressure on the first firing stroke or cause the engine to race.

One object of our invention is to provide in connection with the fuel injector for such an engine an improved arrangement in which the fuel is by-passed around the fuel injector during the starting period and until such time as the blast air pressure is built up to the desired value.

A further object of our invention is to provide an improved arrangement in which the blast air conduit which leads to the fuel injector is closed off during the starting period to prevent wasting of such air so that the pressure will build up more quickly.

A still further object of our invention is to provide such a structure in which the valve for controlling the by-passing of fuel and the valve which blocks off the blast air conduit are both located in the body of the fuel injector and coöperate with each other, the blast air valve when opened causing the fuel by-pass valve to close. Preferably, the fuel by-pass valve is automatically closed and the valve which blocks off the blast air conduit is automatically opened by the pressure of the blast air when it reaches a predetermined value. The arrangement is also preferably such that after the valve which blocks off the blast air conduit has been opened, it will be maintained open until the blast air pressure falls below a value a certain amount less than that required to open it. This prevents the engine from stopping in case the blast air pressure, for any reason, drops somewhat.

For a consideration of what we believe to be novel and our invention, attention is directed to the accompanying specification and the claims appended thereto.

In the drawing which illustrates one form which our invention may take, Figure 1 is a vertical section through a fuel injector taken on line 1—1, Fig. 2, and Fig. 2 is a horizontal section taken on line 2—2, Fig. 1.

Referring to the drawing, 5 indicates the upper portion of an engine cylinder having the combustion chamber 6, and 7 the body of a fuel injector fixed on the top of the cylinder by bolts 8. The fuel injector may be of any approved type. 9 indicates its needle valve which is actuated by a lever 10 operated in synchronism with the engine, and 11 a spring which biases the valve 9 to its seat. Fuel is supplied to the fuel injector around the needle valve 9 through a conduit 12 and blast air is supplied thereto through the conduit 13. The operation of a fuel injector of this general type is well understood and needs no detail description.

The outer portion of the fuel supply conduit 12 is counterbored and threaded to receive a sleeve 14 at the inner end of which is a gasket 14$^a$ which forms a seat for a check valve 15, the stem 16 of which is guided in the sleeve. The valve 15 is pressed toward its seat by a spring 17. The outer end of sleeve 14 is threaded as indicated at 18 to receive a pipe connection (not shown) which joins the usual pipe leading from the fuel pump to the injector. At 19 is an annular chamber surrounding the sleeve 14 and formed in the present instance by cutting a groove therein. The chamber 19 is connected by passages 20 (Fig. 2) to the bore of sleeve 14 and by a conduit 21 to an annular space 22 formed between the wall of a socket 23 and a tubular spring cage 24 which is screwed into the outer counterbored end 23ª of the socket. Into the outer end of spring cage 24 is threaded a member 25 having a bore 26 and provided with a valve seat 27 against which takes a fuel by-pass valve 28. The stem of valve 28 is guided in the bore 26 and terminates in a head 29 against which bears a spring 30 located in a spring holder 31. The head 29 terminates within the spring holder 31 and is adapted to be engaged by a flange 31ª so that when the spring holder is moved toward the left in Fig. 2, the by-pass valve 28 will be opened. The socket 23 is connected by a passage 32 with the outer end of conduit 13 which is in the form of a threaded recess 13ª. A nipple 33 is screwed into recess 13ª and has a valve seat 34 on its inner end. On its outer end it is adapted to receive a pipe connection (not shown) to connect the blast air pipe which leads from the blast air compressor, to the fuel injector. 35 is a blast air check valve adapted to engage seat 34 and provided with a stem 36 guided in the bore of nipple 33. This valve 35 is of a quick opening type being provided with a skirt 35ª against which the pressure acts as soon as the valve begins to open thus causing the valve to move very quickly. 37 is a valve adapted to engage a seat 38 to close passage 32. Its stem 39 is guided by the walls of passage 32 and the end of stem 39 engages the spring holder 31. Surrounding the spring holder 31 and within spring cage 24 is a spring 40 which bears against a flange 41 on spring holder 31 and tends to force the valve 37 toward open position. Valve 37 engages the head of valve 35 in such a manner that when forced by spring 40 to open position, the valve 35 will be closed. By the same movement fuel by-pass valve 28 will be opened. The tension of spring 40 may be adjusted by means of washers 42 located between flange 41 and the end of the spring. Screwed over the outer end of spring cage 24 is a cap 43 forming a chamber 44 which is connected by longitudinally extending grooves 45 to the annular space 22. Socket 23 and passage 32 are connected by vertically extending holes 46 indicated in dotted lines in Fig. 2 to drain openings 47 into which pipes 48 may be connected leading to any suitable receiver. 49 is an automatically opening spring pressed safety valve connected by horizontal passage 50 and vertical passage 51 to the compression chamber of the cylinder. Its purpose is to act as a safety valve for the engine cylinder in case of excess pressure occurring therein.

When the engine is at rest, the blast air check valve 35 is held on its seat 34 and the valve 37 is held open by the spring 40 which forces the spring holder 31 toward the left in Fig. 2. Such movement of the spring holder 31 also opens the fuel by-pass valve 28. The check valve 15 in the fuel inlet conduit 12 is held seated by the spring 17. Now when the engine is turned over by some auxiliary means to start it, the fuel pump will be operated as will also the blast air compressor. Since the by-pass valve 28 is open, the fuel delivered by the pump will not be forced by the check valve 15 to the region around the needle valve 9 but will flow by way of passages 20, annular chamber 19, conduit 21, annular space 22 and grooves 45 to chamber 44 in cap 43 from which it will flow through bore 26 and past valve 28 to the region around spring 40 and into passage 32 from which it is drained away through holes 46 and drain openings 47. The blast air conduit 13 being closed by valve 34 air from the delivery side of the blast air compressor cannot be wasted through the injector valve 9 which is being periodically opened. As a consequence the blast air pressure will build up much more quickly than otherwise. The spring 40 is so adjusted that when the blast air pressure has reached a certain desired value it will overcome the pressure of the spring and force the valve 35 open. At the same time the valve 37 will be forced against seat 38 to prevent the leakage of blast air by way of the fuel drain passages 46, 47, and the by-pass valve 27 will be closed. The spring 30 which holds the by-pass valve 28 closed is stronger than the spring 17 of check valve 15 so that the fuel delivered by the pump will now be forced past the check valve 15 to the region around needle valve 9 from where it will be blown into the combustion chamber by blast air when the valve 9 opens.

The valve stem 39 and spring holder 31 form an operating connection between the blast air check valve 35 and the fuel by-pass valve 28, the two valves being forced in the one direction by spring 40 and in the opposite direction by the blast air pressure. This operating connection extends from recess 13ª which normally contains the high pressure blast air, to passage 32 which is a region of atmospheric pressure, and the purpose of the valve 37 is to cut off communication between such recess and passage. This avoids the use of a stuffing box for the operating connection.

It will be noted that when the blast air check valve 34 is open, the spring 40 is opposed to the pressure of the blast air on a larger area, i. e. the area of the valve 37, than when the valve 34 is closed. By this arrangement after the valve 34 has been opened by a certain pressure it will be held open until such pressure falls a certain amount depending on the ratio of the two surfaces to each other.

Since the by-pass valve 28 is yieldingly held to its seat by spring 30, it will function as a safety or pressure relief valve and in case for any reason there is a stoppage in the fuel conduit 12 it will open to by-pass fuel thus preventing damage to the pump. Also in case of failure of the blast air, as, for example, due to one of the blast pipes being disrupted, the valve 35 will be immediately closed and the by-pass valve 28 opened thus automatically shutting down the engine and by-passing any fuel which may be pumped while the engine is coming to rest, thus avoiding the accumulation of excess fuel in the injector to give trouble when the engine is again started.

The check valve 15 in fuel conduit 12, it will be seen, permits fuel to flow toward the fuel injector but closes automatically to prevent it from flowing in the opposite direction. This is to prevent the blast air from blowing fuel back through conduit 12 toward the pump or the by-pass valve 27.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent of the United States, is—

1. In an apparatus of the character described, the combination with an engine cylinder, of a fuel injector having a body provided with a conduit through which fuel is supplied and a conduit through which blast air is supplied, a by-pass conduit leading from the fuel supply conduit, a by-pass valve therein, a valve in the blast air conduit which is opened by the pressure of the blast air, and means for closing the by-pass valve when the blast air valve opens.

2. In an apparatus of the character described, the combination with an engine cylinder, of a fuel injector having a body provided with a conduit through which fuel is supplied and a conduit through which blast air is supplied, a by-pass conduit leading from the fuel supply conduit, a by-pass valve therein, a valve in the blast air conduit which is opened by the pressure of the blast air, and an operating connection between said valves so that when the blast air valve is opened the fuel by-pass valve is closed.

3. In an apparatus of the character described, the combination with an engine cylinder, of a fuel injector having a body provided with a conduit through which fuel is supplied and a conduit through which blast air is supplied, a by-pass conduit leading from the fuel supply conduit, a by-pass valve therein, a valve in the blast air conduit which is opened by the pressure of the blast air, and an operating connection between said valves so that when the blast air valve is open the fuel by-pass valve is closed, and means biasing the blast air valve toward closed position and the by-pass valve toward open position.

4. In an apparatus of the character described, the combination of an engine cylinder, a fuel injector, a conduit for conveying fuel to the injector, a conduit for conveying blast air to the injector, a by-pass conduit leading from the fuel conduit, a valve therein, a valve in the blast air conduit, and an operating connection between said valves so arranged that when the one valve is open the other will be closed.

5. In an apparatus of the character described, the combination of an engine cylinder, a fuel injector, a conduit for conveying fuel to the injector, a conduit for conveying blast air to the injector, a by-pass conduit leading from the fuel conduit, a by-pass valve therein, a check valve in the blast air conduit which is adapted to be opened by the pressure of the blast air, an operating connection between said valves, and means biasing the by-pass valve toward open position and the check valve toward closed position.

6. In an apparatus of the character described, the combination of an engine cylinder, a fuel injector, a conduit for conveying fuel to the injector, a conduit for conveying blast air to the injector, a by-pass conduit leading from the fuel conduit, a valve therein, a valve in the blast air conduit, and an operating connection between said valves so arranged that when the one valve is opened the other will be closed, the valve in said by-pass conduit opening away from the injector and being yieldingly held to its seat so that it may function automatically as a pressure relief valve.

7. In an apparatus of the character described, the combination with an engine cylinder, of a fuel injector having a body provided with a conduit through which fuel is supplied and a conduit through which blast air is supplied, a by-pass conduit leading from the fuel supply conduit, a by-pass valve therein, a valve in the blast air conduit which is opened by the pressure of the blast air, a passage connecting the by-pass conduit to the blast air conduit, an operating connection between said valves which extends through said passage, and a valve carried by said operating connection for shutting off said passage.

8. In an apparatus of the character described, the combination with an engine cylinder, of a fuel injector having a valve which controls the admission of fuel, a body provided with a conduit through which fuel is supplied and a conduit through which blast air is supplied, a check valve in the blast air conduit in advance of the fuel valve as regards the direction of flow, said check valve opening toward the fuel valve, and means biasing it toward closed position but permitting it to open automatically when the pressure of the blast air reaches a predetermined value whereby no blast air will be admitted to the fuel injector until such pressure is reached.

9. In an apparatus of the character described, the combination with an engine cylinder, of a fuel injector having a valve which controls the admission of fuel, a body provided with a conduit through which fuel is supplied and a conduit through which blast air is supplied, a check valve in the blast air conduit in advance of the fuel valve as regards the direction of flow, said check valve opening toward the fuel valve, and means biasing it toward closed position, said check valve being forced open by the blast air pressure when it reaches a predetermined value, and said check valve exposing a greater area to the blast air pressure when open so that it will not be closed until the pressure falls below a predetermined value.

10. In an apparatus of the character described, the combination of an engine cylinder, a fuel injector, a conduit for conveying fuel to the injector, a conduit for conveying blast air to the injector, a by-pass conduit leading from the fuel conduit, a valve therein, means biasing said valve to an open position, and means associated with said valve upon which the blast air acts to close the valve against such biasing means when the blast air pressure reaches a predetermined value.

11. In an apparatus of the character described, the combination of an engine cylinder, a fuel injector, a conduit for conveying fuel to the injector, a conduit for conveying blast air to the injector, a by-pass conduit leading from the fuel conduit, a valve therein, means biasing said valve to an open position, and means associated with said valve upon which the blast air acts to close the valve against such biasing means when the blast air pressure reaches a predetermined value, the valve in said by-pass conduit opening away from the injector and being yieldingly held to its seat so that it may function automatically as a pressure relief valve.

In witness whereof, we have hereunto set our hands this 20th day of Oct., 1917.

WILLIAM EVERETT VER PLANCK.
HENRY W. STOCK.